United States Patent
Gaston et al.

(10) Patent No.: US 11,623,749 B2
(45) Date of Patent: Apr. 11, 2023

(54) PASSENGER SEAT PRIVACY PANEL ASSEMBLY

(71) Applicant: Safran Seats USA LLC, Gainesville, TX (US)

(72) Inventors: Joe H. Gaston, Atlanta, GA (US); Jeremy Green, Lantana, TX (US); Paul Bentley, Gainesville, TX (US)

(73) Assignee: Safran Seats USA LLC, Gainesville, TX (US)

( * ) Notice: Subject to any disclaimer, the term of this patent is extended or adjusted under 35 U.S.C. 154(b) by 123 days.

(21) Appl. No.: 17/053,549

(22) PCT Filed: Jun. 29, 2018

(86) PCT No.: PCT/US2018/040288
§ 371 (c)(1),
(2) Date: Nov. 6, 2020

(87) PCT Pub. No.: WO2019/216927
PCT Pub. Date: Nov. 14, 2019

(65) Prior Publication Data
US 2021/0237880 A1 Aug. 5, 2021

Related U.S. Application Data

(60) Provisional application No. 62/668,052, filed on May 7, 2018.

(51) Int. Cl.
*B64D 11/06* (2006.01)
(52) U.S. Cl.
CPC ................ *B64D 11/0606* (2014.12)
(58) Field of Classification Search
CPC ............... B64D 11/0606; B64D 11/06; B64D 11/0604; B64D 11/0641;
(Continued)

(56) References Cited

U.S. PATENT DOCUMENTS 3,803,765 A * 4/1974 Ritner ................. E05D 15/0621
  49/427
4,834,449 A * 5/1989 Engelman ................ A61G 5/10
  297/145

(Continued)

FOREIGN PATENT DOCUMENTS

EP       3312090 A1   4/2018
WO    2018033599 A1   2/2018

OTHER PUBLICATIONS

International Patent Application No. PCT/US2018/040288, International Search Report and Written Opinion, dated Jan. 31, 2019.

(Continued)

*Primary Examiner* — Christopher D Hutchens
(74) *Attorney, Agent, or Firm* — Kilpatrick Townsend & Stockton LLP (57) ABSTRACT

A privacy panel assembly for a passenger seat includes a vertically extending panel attached to a lateral surface of the passenger seat such that the vertically extending panel includes a forward edge and an aft edge and at least one sliding mechanism attached to an interior surface of the vertically extending panel. The vertically extending panel includes a stowed configuration and a deployed configuration. In the stowed configuration, the aft edge of the vertically extending panel is disposed on an aft side of a rear surface of a seatback of the passenger seat. In the deployed configuration, the aft edge of the vertically extending panel is approximately aligned with a seating surface of the seatback on a forward side of the passenger seat.

17 Claims, 6 Drawing Sheets

(58) Field of Classification Search
CPC .... B60R 2011/0021; B01J 5/062; B60N 2/91; E05D 15/06; E05D 15/0617; E05D 15/0621; E05D 15/101; E05D 15/1007; E05D 15/1005; E05D 2015/1039
See application file for complete search history.

(56) References Cited

U.S. PATENT DOCUMENTS

| | | | | |
|---|---|---|---|---|
| 4,944,552 | A * | 7/1990 | Harris | B64D 11/0638 297/145 |
| 5,675,946 | A * | 10/1997 | Verbeek | E06B 3/4663 52/64 |
| 8,028,630 | B2 * | 10/2011 | Merensky | B64D 11/0638 297/147 |
| 8,931,834 | B2 * | 1/2015 | Wallace | B64D 11/0646 244/118.6 |
| 10,384,566 | B2 * | 8/2019 | Kondrad | B60N 2/0232 |
| 2001/0000639 | A1 * | 5/2001 | Park | B60N 2/34 297/411.3 |
| 2005/0067870 | A1 * | 3/2005 | Rezag | B64D 11/0604 297/354.13 |
| 2006/0219843 | A1 * | 10/2006 | Martin | B61D 31/00 244/118.6 |
| 2008/0092784 | A1 * | 4/2008 | Merensky | B64D 11/06 108/91 |
| 2009/0050740 | A1 * | 2/2009 | Saint-Jaimes | B64D 11/0601 244/118.6 |
| 2013/0076082 | A1 * | 3/2013 | Herault | B64D 11/06 297/173 |
| 2013/0241247 | A1 | 9/2013 | Wallace et al. | |
| 2013/0248654 | A1 * | 9/2013 | Henshaw | B64D 11/06 244/118.6 |
| 2014/0300148 | A1 * | 10/2014 | Frost | B64D 11/0638 297/173 |
| 2015/0321592 | A1 * | 11/2015 | De Morais | B64D 11/0641 297/135 |
| 2017/0259923 | A1 * | 9/2017 | Morgan | B64D 11/0644 |
| 2017/0283064 | A1 * | 10/2017 | Robinson | E06B 3/509 |
| 2018/0281963 | A1 * | 10/2018 | Dowty | B64D 11/0606 |
| 2020/0122838 | A1 * | 4/2020 | Bonnefoy | B64D 11/0023 |

OTHER PUBLICATIONS

Europe Patent Application No. 18743333.9, Office Action (Communication pursuant to Article 94(3) EPC), dated Jun. 9, 2022.

* cited by examiner

PASSENGER SEAT PRIVACY PANEL ASSEMBLY

CROSS REFERENCE TO RELATED APPLICATION

This application is related to and claims the benefit of U.S. Provisional Application No. 62/668,052 ("the '052 application"), filed on May 7, 2018, entitled SLIDING TRANSLUCENT PRIVACY DOOR/PRIVACY PANELS. The '052 application is hereby incorporated in its entirety by this reference.

FIELD OF THE INVENTION

The field of the invention relates to moveable privacy panel assemblies for passenger seats in aircraft or the like.

BACKGROUND

Passenger seats, and particularly vehicle or aircraft passenger seats, are designed based on numerous factors including, for example, enhancing comfort, aesthetics, and convenience. In addition, passenger seats and arrays thereof are designed to maximize efficiencies related to available space within the cabin of the vehicle. Due to such efficiencies, conventional seats may be designed with minimal space available for each individual passenger.

In certain situations, it may be desirable to design seats with moveable privacy panels on at least one side thereof. In particular, it may be desirable to design and produce a moveable privacy panel for creating a personal space for a passenger such that the privacy panel reduces sound and light while enhancing privacy within the personal space.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a privacy panel assembly for a passenger seat comprises: a vertically extending panel attached to a lateral surface of the passenger seat, the vertically extending panel comprising a forward edge and an aft edge; and at least one sliding mechanism attached to an interior surface of the vertically extending panel, wherein: the vertically extending panel comprises a stowed configuration and a deployed configuration; in the stowed configuration, the aft edge of the vertically extending panel is disposed on an aft side of a rear surface of a seatback of the passenger seat; and in the deployed configuration, the aft edge of the vertically extending panel is approximately aligned with a seating surface of the seatback on a forward side of the passenger seat.

In some embodiments, in the stowed configuration, the forward edge of the vertically extending panel is disposed adjacent to an aft end of an armrest of the passenger seat; and in the deployed configuration, the forward edge of the vertically extending panel is disposed closer to a forward end of the armrest compared to the aft end of the armrest of the passenger seat.

In certain embodiments, the at least one sliding mechanism comprises two slides including an upper slide and a lower slide.

In some embodiments, an exterior surface of the vertically extending panel comprises at least one cover member that corresponds to a location of the at least one sliding mechanism; and the at least one cover member protrudes from the exterior surface of the vertically extending panel.

The at least one sliding mechanism, in certain embodiments, is manually operable to move the vertically extending panel between the stowed configuration and the deployed configuration.

The at least one sliding mechanism, in certain embodiments, is electronically controlled to move the vertically extending panel between the stowed configuration and the deployed configuration.

In some embodiments, at least a portion of the vertically extending panel is translucent.

The at least one sliding mechanism, in some embodiments, is attached to a static panel of the passenger seat such that the at least one sliding mechanism extends between the interior surface of the vertically extending panel and the static panel.

In certain embodiments, a lowermost edge of the vertically extending panel is approximately aligned with a seat pan of the passenger seat.

The privacy panel assembly, in certain embodiments, further comprises a lock mechanism to secure the vertically extending panel in at least one of the stowed configuration and the deployed configuration.

According to certain embodiments of the present invention, a passenger seat comprises: a fixed panel adjacent to a lateral side of the passenger seat; and a privacy panel assembly attached to the fixed panel, the privacy panel assembly comprising a vertically extending panel, wherein: the vertically extending panel comprises a stowed configuration and a deployed configuration; in the stowed configuration, an aft edge of the vertically extending panel is disposed on an aft side of a rear surface of a seatback of the passenger seat; and in the deployed configuration, the aft edge of the vertically extending panel is approximately aligned with a seating surface of the seatback on a forward side of the passenger seat.

In certain embodiments, in the stowed configuration, a forward edge of the vertically extending panel is disposed adjacent to an aft end of an armrest of the passenger seat; and in the deployed configuration, the forward edge of the vertically extending panel is disposed closer to a forward end of the armrest compared to the aft end of the armrest of the passenger seat.

The privacy panel assembly, in certain embodiments, comprises at least one sliding mechanism for attaching the privacy panel assembly to the fixed panel.

The at least one sliding mechanism, in some embodiments, comprises two slides including an upper slide and a lower slide.

In some embodiments, an exterior surface of the vertically extending panel comprises at least one cover member that corresponds to a location of the at least one sliding mechanism; and the at least one cover member protrudes from the exterior surface of the vertically extending panel.

The at least one sliding mechanism, in certain embodiments, is manually operable to move the vertically extending panel between the stowed configuration and the deployed configuration.

In certain embodiments, the at least one sliding mechanism is electronically controlled to move the vertically extending panel between the stowed configuration and the deployed configuration.

In some embodiments, at least a portion of the vertically extending panel is translucent.

In some embodiments, a lowermost edge of the vertically extending panel is approximately aligned with a seat pan of the passenger seat.

The passenger seat, in certain embodiments, further comprises a lock mechanism to secure the vertically extending panel in at least one of the stowed configuration and the deployed configuration.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1A:
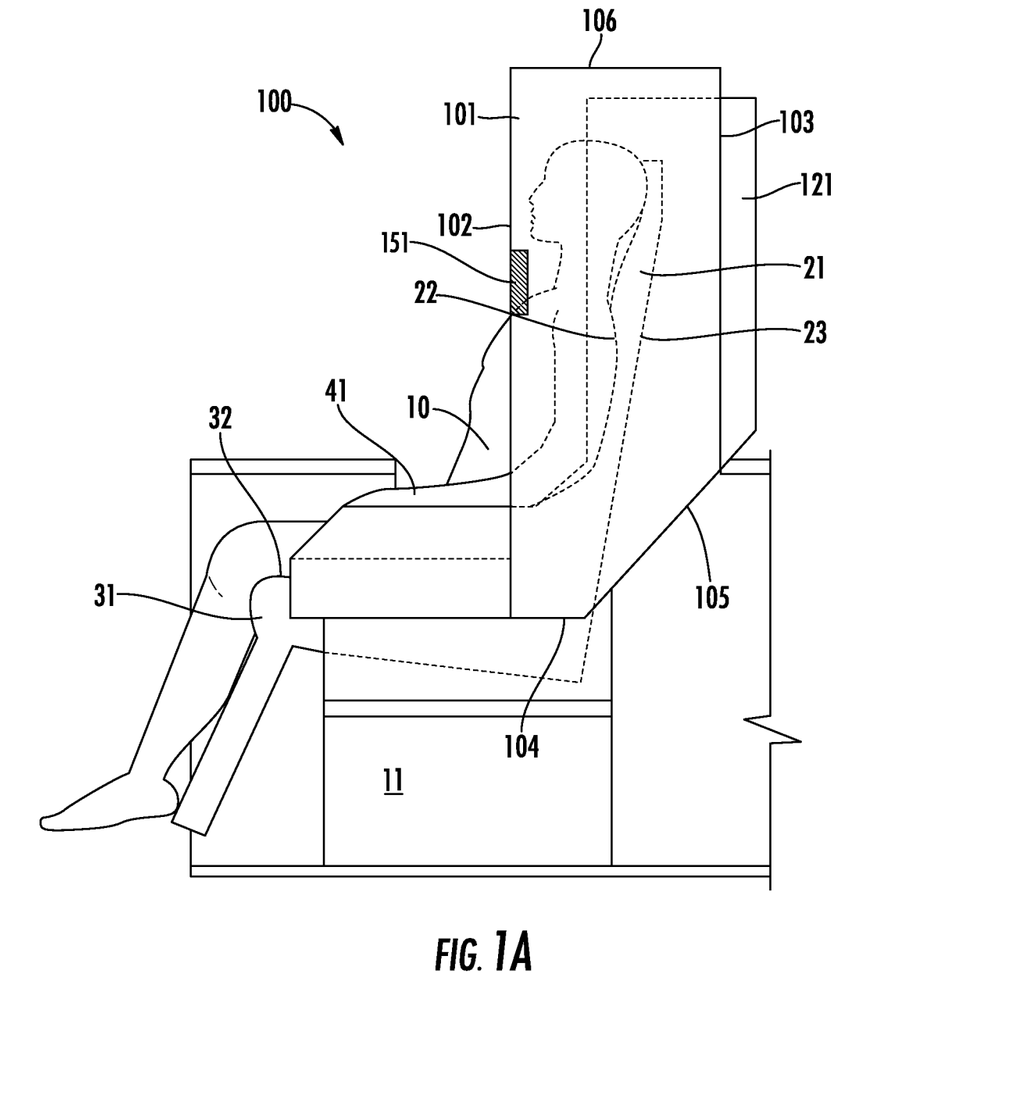
FIG. 1A is a side view of a privacy panel assembly in a stowed configuration according to certain embodiments of the present invention.

FIGS. 1A-4 illustrate embodiments of privacy panel assemblies 100 for passenger seats 11 in vehicles such as an aircraft. The privacy panel assemblies 100 are illustrated adjacent to an aisle of a vehicle; however, the privacy panel assemblies 100 may be located in other locations relative to a seat 11 including, for example, in between adjacent passenger portions of a seat 11. The privacy panel assembly 100 may include a vertically extending panel 101 and at least one sliding mechanism 141, 142. The vertically extending panel 101 may include a forward edge 102, an aft edge 103, a bottom edge 104, and a top edge 106. The vertically extending panel 101 may have a rectangular shape (see FIGS. 2A-4). In some embodiments, the vertically extending panel 101 may have an irregular pentagonal shape such that the vertically extending panel 101 has a fifth edge 105 (see FIGS. 1A and 1B). In some embodiments, the fifth edge 105 intersects the aft edge 103 and the bottom edge 104 at approximately 45° angles. As shown in FIGS. 1A and 1B, in some embodiments, the bottom edge 104 is approximately aligned with a surface 32 of a seat pan 31 upon which a passenger 10 sits. In some embodiments, the bottom edge 104 is located below the seat pan 31 (see FIGS. 2A and 2B).

In some embodiments, the vertically extending panel 101 may include a portion that is translucent, transparent, or opaque. In other cases, the entire vertically extending panel 101 may be translucent, transparent, or opaque. The vertically extending panel 101 may include (in part or entirely) polycarbonate, thermoplastic acrylic-polyvinyl chloride, thermoplastic alloy, a recycled resin product, or other polymer or plastic materials. The vertically extending panel 101 may also include a color or embedded graphical film element (e.g., a printed graphic, infused image, pattern, or texture). In some cases, the vertically extending panel 101 may have a protective film applied to at least one surface to increase chemical and stain resistance. In some embodiments, the vertically extending panel 101 may have a protective film or coating that comprises polyvinyl fluoride or a thermoplastic fluoropolymer material. The edges of the vertically extending panel 101, in some cases, may be beveled to reduce risk or injury.

Figure 1B:
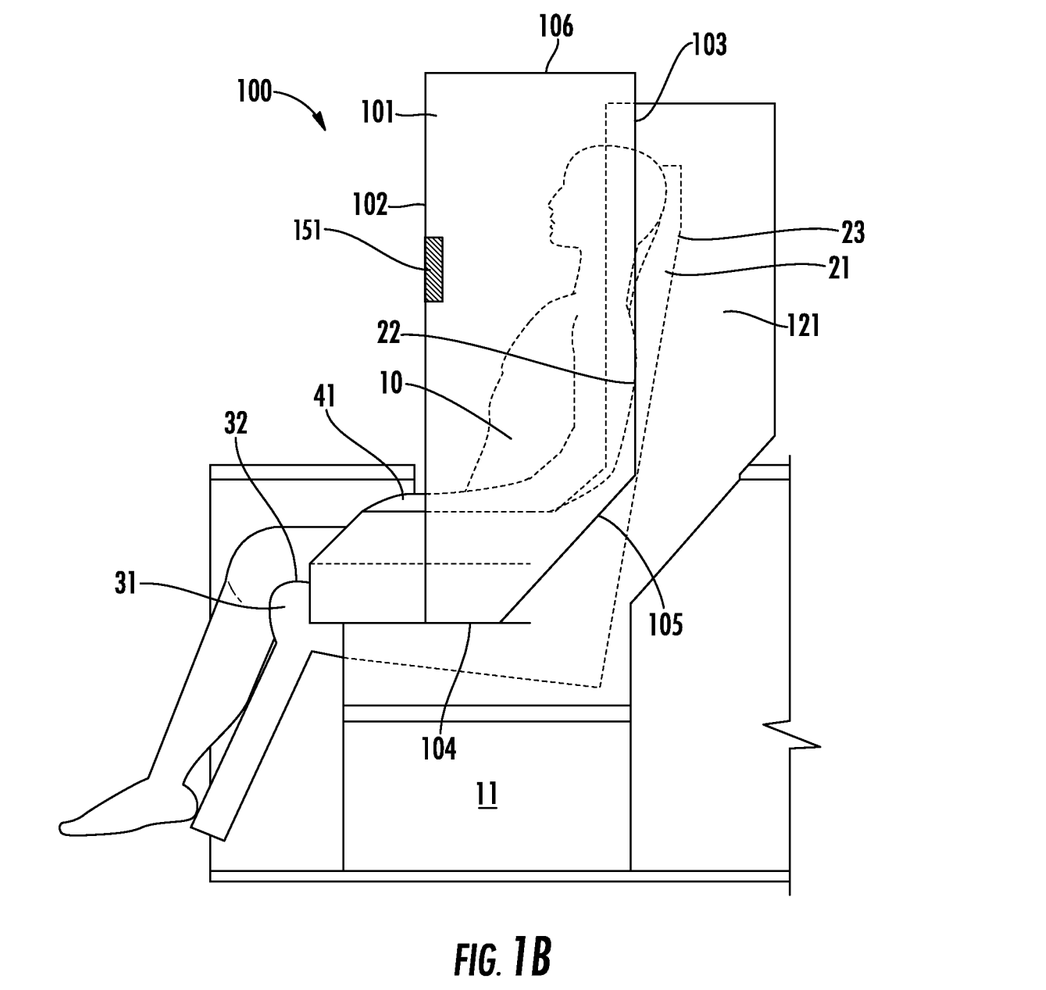
FIG. 1B is a side view of the privacy panel assembly of FIG. 1A in a deployed configuration.
Figure 2A:
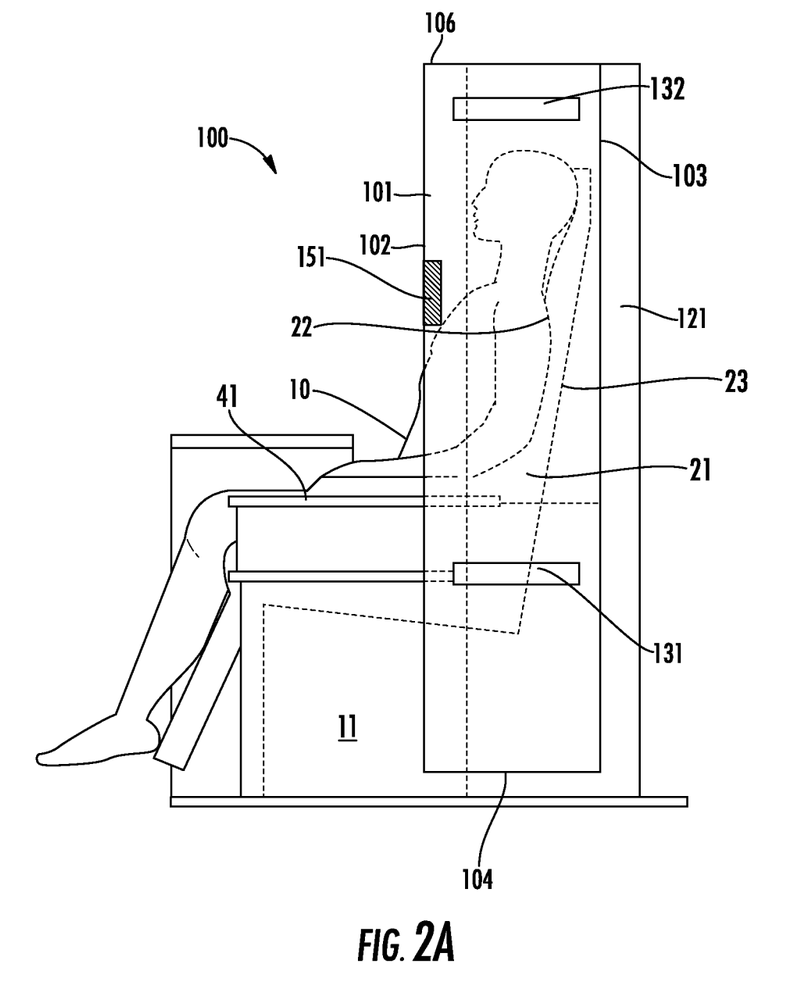
FIG. 2A is a side view of a privacy panel assembly in a stowed configuration according to certain embodiments of the present invention.
Figure 2B:
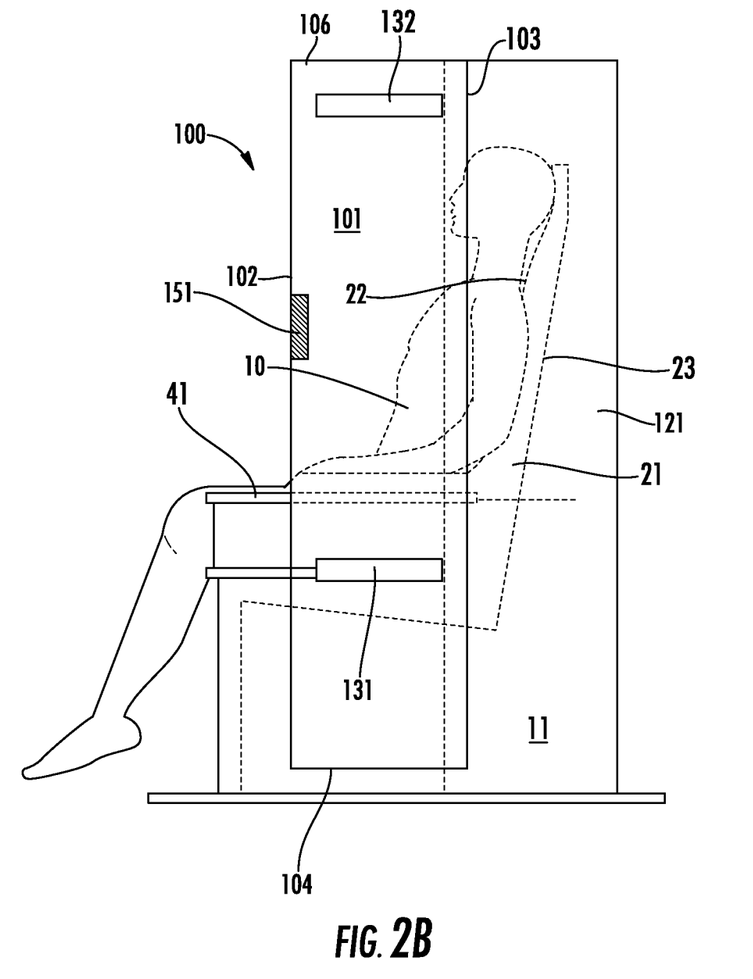
FIG. 2B is a side view of the privacy panel assembly of FIG. 2A in a deployed configuration.
Figure 3:
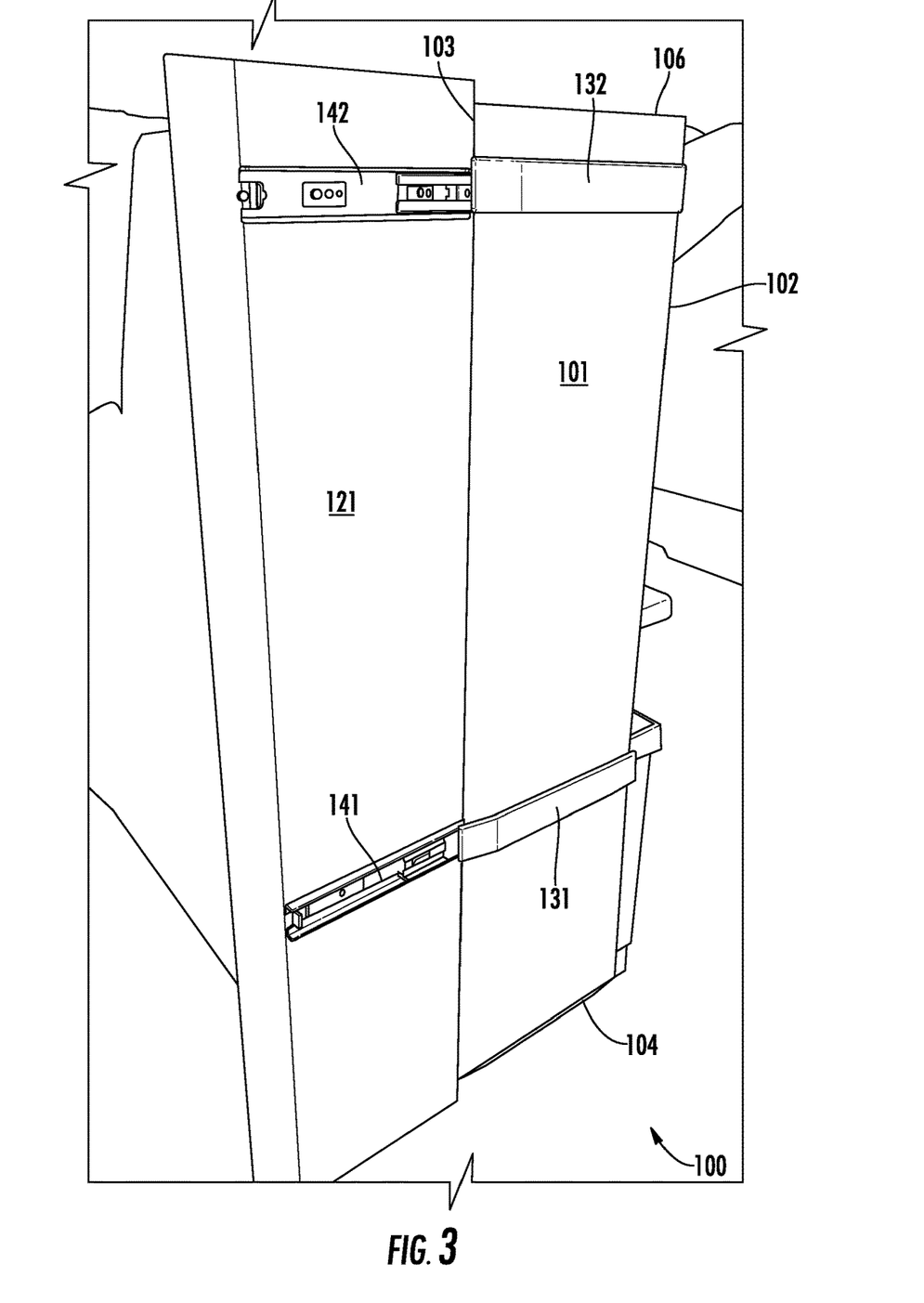
FIG. 3 is a rear perspective view of the privacy panel assembly of FIG. 2A.
Figure 4:
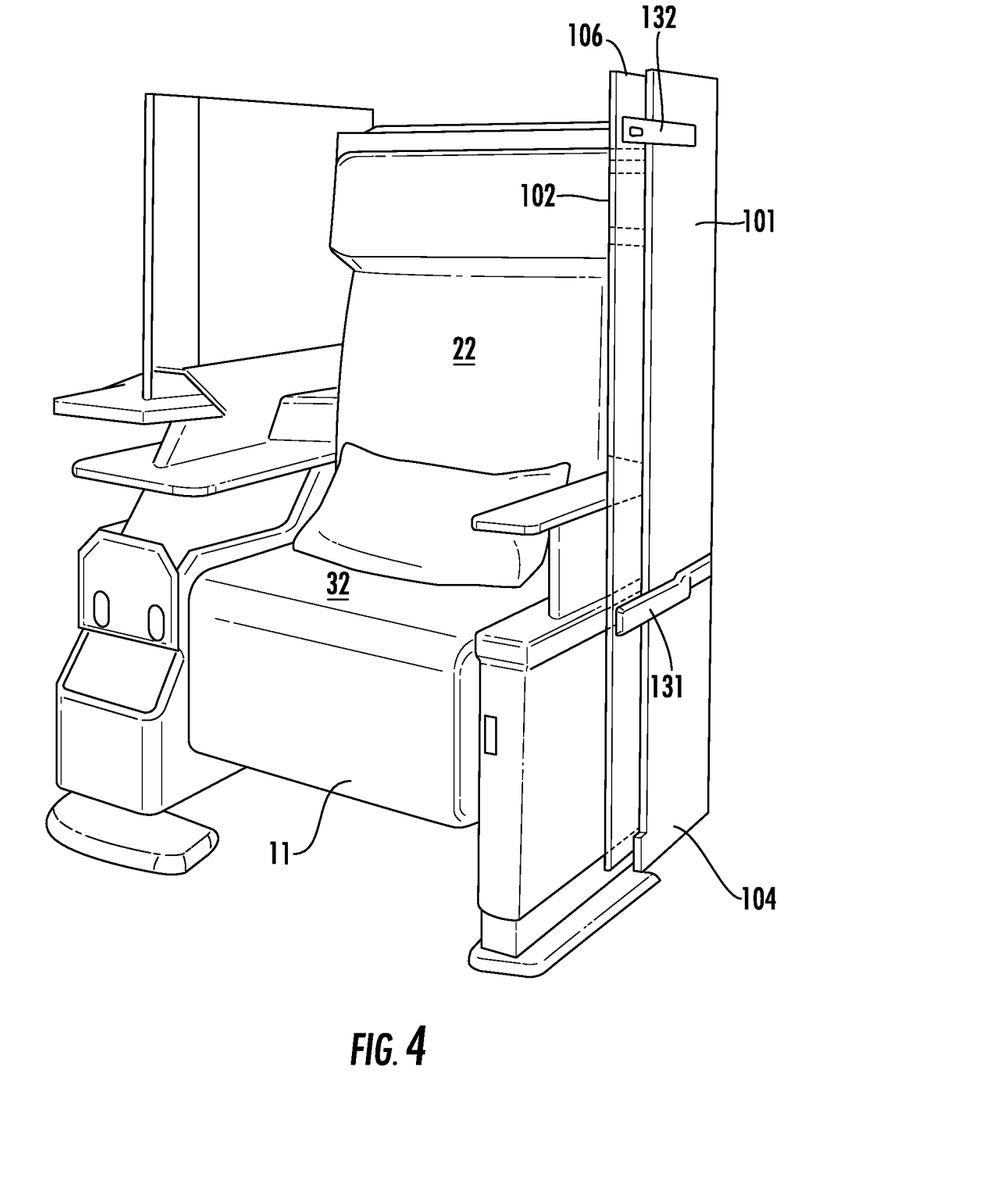
FIG. 4 is a front perspective view the privacy panel assembly of FIG. 2A.

The privacy panel assembly 100 may include a stowed configuration (see FIGS. 1A and 2A) and a deployed configuration (see FIGS. 1B and 2B). In some embodiments, the at least one sliding mechanism 141, 142 allows the vertically extending panel 101 to slide in a forward/aft direction along a lateral side of a seat 11 relative to a fixed panel 121. The fixed panel 121 may be a portion of the seatback 21, a portion of a seat shell, or any other interior component of a vehicle capable of supporting the vertically extending panel 101. In some embodiments, the at least one sliding mechanism comprises two slides including a lower slide 141 and an upper slide 142.

As shown in FIGS. 1A and 2A, when the privacy panel assembly 100 is in the stowed configuration, the aft edge 103 of the vertically extending panel 101 is disposed on an aft side of a rear surface 23 of a seatback 21 of the passenger seat 11. In some embodiments, in the stowed configuration, the forward edge 102 of the vertically extending panel 101 is disposed adjacent to an aft end of an armrest 41 of the passenger seat 11 (see FIG. 1A).

When the privacy panel assembly 100 is in the deployed configuration, in some embodiments, the aft edge 103 of the vertically extending panel 101 is approximately aligned with a seating surface 22 of the seatback 21 on a forward side of the passenger seat 11 (see FIG. 1B). In some embodiments, when the privacy panel assembly 100 is in the deployed configuration, the aft edge 103 of the vertically extending panel 101 is disposed slightly forward of a lowermost portion of a seating surface 22 of the seatback 21 of the passenger seat 11 (see FIG. 2B). In the deployed configuration, the forward edge 102 of the vertically extending panel 101 is disposed closer to a forward end of the armrest 41 compared to the aft end of the armrest 41 of the passenger seat 11 (see FIGS. 1B and 2B).

In some embodiments, the privacy panel assembly 100 may include at least one handle 151 such that the passenger 10 (or a flight attendant) may manually move the privacy panel assembly 100 between the stowed configuration and the deployed configuration. As shown in FIGS. 1A-2B, the handle 151 may be disposed adjacent to the forward edge 102 of the vertically extending panel 101. The handle 151, in some embodiments, may be disposed such that the handle 151 is approximately aligned with a chest or neck of a passenger 10 when seated in the seat 11. In some embodiments, the at least one sliding mechanism 141, 142 is automated such that movement between the stowed configuration and the deployed configuration may be electronically controlled (by the passenger 10 in the seat 11, by a flight attendant at a remote location, and/or configured to automatically move to the stowed configuration during certain vehicle conditions, such as taxi, takeoff, landing). In some cases, the privacy panel assembly 100 may include a lock mechanism to secure the vertically extending panel 101 in the stowed configuration (e.g., during taxi, takeoff, and landing conditions), in the deployed configuration (e.g., to enhance privacy for the passenger 10), or in both the stowed configuration and the deployed configuration. The lock mechanism may be internal to the at least one sliding mechanism 141, 142 such that there is an increased resistance to move to/from a fully stowed or deployed configuration (e.g., a detent mechanism). In some embodiments, the lock mechanism may include an electronically controlled lock such that the vertically extending panel 101 may be secured in the stowed configuration from a remote or central location (e.g., a flight attendant may control a plurality of vertically extending panels 101 simultaneously).

As shown in FIGS. 2A-4, the privacy panel assembly 100 may include a cover member 131, 132 for each at least one sliding mechanism 141, 142. In some embodiments, a first cover member 131 conceals at least part of a portion of first sliding mechanism 141 attached to the vertically extending panel 101. When the privacy panel assembly 100 is in the stowed configuration, the first cover member 131 may conceal at least part of the portion of the first sliding mechanism 141 attached to the vertically extending panel 101 and at least part of the portion of the first sliding mechanism 141 attached to the fixed panel 121. In some embodiments, a second cover member 132 conceals at least part of a portion of second sliding mechanism 142 attached to the vertically extending panel 101. When the privacy panel assembly 100 is in the stowed configuration, the second cover member 132 may conceal at least part of the portion of the second sliding mechanism 142 attached to the vertically extending panel 101 and at least part of the portion of the second sliding mechanism 142 attached to the fixed panel 121. The cover members 131, 132 may protect the at least one sliding mechanism 141, 142 from damage due to objects in the vehicle (e.g., passengers, service trolleys, etc.). In some embodiments, the cover member(s) 131, 132 may protrude from the exterior surface of the vertically extending panel 101 and may include a softer material than the material of the vertically extending panel 101. The cover member(s) 131, 132 may also provide surface for branding, marketing, or advertising materials.

The components of the privacy panel assembly 100 may be formed of materials including, but not limited to, aluminum, steel, titanium, carbon composite, graphite composite, polyester, nylon, plastic, thermoplastic, other fabric materials, stainless steel, other plastic or polymer materials, other metallic materials, other composite materials, or other similar materials. Moreover, the components of the privacy panel assembly 100 may be attached to one another via suitable fasteners, which include, but are not limited to, screws, bolts, rivets or other mechanical or chemical fasteners.

In the following, further examples are described to facilitate understanding of aspects of the invention:

Example A. A privacy panel assembly for a passenger seat comprising:

a vertically extending panel attached to a lateral surface of the passenger seat, the vertically extending panel comprising a forward edge and an aft edge; and at least one sliding mechanism attached to an interior surface of the vertically extending panel, wherein:

the vertically extending panel comprises a stowed configuration and a deployed configuration;

in the stowed configuration, the aft edge of the vertically extending panel is disposed on an aft side of a rear surface of a seatback of the passenger seat; and in the deployed configuration, the aft edge of the vertically extending panel is approximately aligned with a seating surface of the seatback on a forward side of the passenger seat.

Example B. The privacy panel assembly of Example A or any of the preceding or subsequent examples, wherein:

in the stowed configuration, the forward edge of the vertically extending panel is disposed adjacent to an aft end of an armrest of the passenger seat; and in the deployed configuration, the forward edge of the vertically extending panel is disposed closer to a forward end of the armrest compared to the aft end of the armrest of the passenger seat.

Example C. The privacy panel assembly of Example A or any of the preceding or subsequent examples, wherein the at least one sliding mechanism comprises two slides including an upper slide and a lower slide.

Example D. The privacy panel assembly of Example A or any of the preceding or subsequent examples, wherein:

an exterior surface of the vertically extending panel comprises at least one cover member that corresponds to a location of the at least one sliding mechanism; and the at least one cover member protrudes from the exterior surface of the vertically extending panel.

Example E. The privacy panel assembly of Example A or any of the preceding or subsequent examples, wherein the at least one sliding mechanism is manually operable to move the vertically extending panel between the stowed configuration and the deployed configuration.

Example F. The privacy panel assembly of Example A or any of the preceding or subsequent examples, wherein the at least one sliding mechanism is electronically controlled to move the vertically extending panel between the stowed configuration and the deployed configuration.

Example G. The privacy panel assembly of Example A or any of the preceding or subsequent examples, wherein at least a portion of the vertically extending panel is translucent.

Example H. The privacy panel assembly of Example A or any of the preceding or subsequent examples, wherein the at least one sliding mechanism is attached to a static panel of the passenger seat such that the at least one sliding mechanism extends between the interior surface of the vertically extending panel and the static panel.

Example I. The privacy panel assembly of Example A or any of the preceding or subsequent examples, wherein a lowermost edge of the vertically extending panel is approximately aligned with a seat pan of the passenger seat.

Example J. The privacy panel assembly of Example A or any of the preceding or subsequent examples, further comprising a lock mechanism to secure the vertically extending panel in at least one of the stowed configuration and the deployed configuration.

Example K. A passenger seat comprising:
a fixed panel adjacent to a lateral side of the passenger seat; and
a privacy panel assembly attached to the fixed panel, the privacy panel assembly comprising a vertically extending panel, wherein:
the vertically extending panel comprises a stowed configuration and a deployed configuration;
in the stowed configuration, an aft edge of the vertically extending panel is disposed on an aft side of a rear surface of a seatback of the passenger seat; and
in the deployed configuration, the aft edge of the vertically extending panel is approximately aligned with a seating surface of the seatback on a forward side of the passenger seat.

Example L. The passenger seat of Example K or any of the preceding or subsequent examples, wherein:
in the stowed configuration, a forward edge of the vertically extending panel is disposed adjacent to an aft end of an armrest of the passenger seat; and
in the deployed configuration, the forward edge of the vertically extending panel is disposed closer to a forward end of the armrest compared to the aft end of the armrest of the passenger seat.

Example M. The passenger seat of Example K or any of the preceding or subsequent examples, wherein the privacy panel assembly comprises at least one sliding mechanism for attaching the privacy panel assembly to the fixed panel.

Example N. The passenger seat of Example M or any of the preceding or subsequent examples, wherein the at least one sliding mechanism comprises two slides including an upper slide and a lower slide.

Example O. The passenger seat of Example M or any of the preceding or subsequent examples, wherein:
an exterior surface of the vertically extending panel comprises at least one cover member that corresponds to a location of the at least one sliding mechanism; and
the at least one cover member protrudes from the exterior surface of the vertically extending panel.

Example P. The passenger seat of Example M or any of the preceding or subsequent examples, wherein the at least one sliding mechanism is manually operable to move the vertically extending panel between the stowed configuration and the deployed configuration.

Example Q. The passenger seat of Example M or any of the preceding or subsequent examples, wherein the at least one sliding mechanism is electronically controlled to move the vertically extending panel between the stowed configuration and the deployed configuration.

Example R. The passenger seat of Example K or any of the preceding or subsequent examples, wherein at least a portion of the vertically extending panel is translucent.

Example S. The passenger seat of Example K or any of the preceding or subsequent examples, wherein a lowermost edge of the vertically extending panel is approximately aligned with a seat pan of the passenger seat.

Example T. The passenger seat of Example K or any of the preceding or subsequent examples, further comprising a lock mechanism to secure the vertically extending panel in at least one of the stowed configuration and the deployed configuration.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A privacy panel assembly for a passenger seat, the privacy panel assembly comprising:
   a vertically extending panel positionable adjacent to a lateral side of the passenger seat, the vertically extending panel comprising a forward edge, an aft edge opposite the forward edge, an exterior surface facing away from the lateral side of the passenger seat, and an interior surface facing the lateral side of the passenger seat; and
   at least one sliding mechanism attached to the interior surface of the vertically extending panel and between a top end and a bottom end of the vertically extending panel, wherein:
   the vertically extending panel comprises a stowed configuration and a deployed configuration;
   in the stowed configuration, the aft edge of the vertically extending panel is positioned aft of an aft edge of a seatback of the passenger seat when the passenger seat is viewed from the lateral side and the passenger seat is in an upright configuration; and
   in the deployed configuration, the aft edge of the vertically extending panel is positioned forward of at least a portion of forward edge of the seatback of the passenger seat when the passenger seat is viewed from the lateral side and the passenger seat is in the upright configuration; and
   wherein:
   the exterior surface of the vertically extending panel comprises at least one cover member that corresponds to a location of the at least one sliding mechanism; and
   the at least one cover member protrudes from the exterior surface of the vertically extending panel.

2. The privacy panel assembly of claim 1, wherein:
   in the stowed configuration, the forward edge of the vertically extending panel is disposed closer to an aft end of an armrest of the passenger seat as compared to a forward end of the armrest of the passenger seat; and
   in the deployed configuration, the forward edge of the vertically extending panel is disposed closer to the forward end of the armrest as compared to the aft end of the armrest of the passenger seat.

3. The privacy panel assembly of claim 1, wherein the at least one sliding mechanism comprises two slides including an upper slide and a lower slide.

4. The privacy panel assembly of claim 1, wherein the at least one sliding mechanism is manually operable to move the vertically extending panel between the stowed configuration and the deployed configuration.

5. The privacy panel assembly of claim 1, wherein the at least one sliding mechanism is electronically controlled to move the vertically extending panel between the stowed configuration and the deployed configuration.

6. The privacy panel assembly of claim 1, wherein at least a portion of the vertically extending panel is translucent.

7. The privacy panel assembly of claim 1, further comprising a lock mechanism to secure the vertically extending panel in at least one of the stowed configuration and the deployed configuration.

8. A passenger seat comprising:
a fixed panel adjacent to a lateral side of the passenger seat; and
a privacy panel assembly attached to the fixed panel such that the fixed panel is between the privacy panel assembly and the lateral side of the passenger seat, the privacy panel assembly comprising a vertically extending panel, wherein:
the vertically extending panel comprises a stowed configuration and a deployed configuration;
in the stowed configuration, an aft edge of the vertically extending panel is positioned aft of an aft edge of a seatback of the passenger seat when the passenger seat is viewed from the lateral side and the passenger seat is in an upright configuration; and
in the deployed configuration, the aft edge of the vertically extending panel is positioned forward of at least a portion of a forward edge of the seatback of the passenger seat when the passenger seat is viewed from the lateral side and the passenger seat is in the upright configuration,
wherein the privacy panel assembly comprises at least one sliding mechanism for attaching the privacy panel assembly to the fixed panel, and
wherein:
an exterior surface of the vertically extending panel comprises at least one cover member that corresponds to a location of the at least one sliding mechanism; and
the at least one cover member protrudes from the exterior surface of the vertically extending panel.

9. The passenger seat of claim 8, wherein:
in the stowed configuration, a forward edge of the vertically extending panel is disposed closer to an aft end of an armrest of the passenger seat as compared to a forward end of the armrest of the passenger seat; and
in the deployed configuration, the forward edge of the vertically extending panel is disposed closer to the forward end of the armrest as compared to the aft end of the armrest of the passenger seat.

10. The passenger seat of claim 8, wherein the at least one sliding mechanism comprises two slides including an upper slide and a lower slide.

11. The passenger seat of claim 8, wherein the at least one sliding mechanism is manually operable to move the vertically extending panel between the stowed configuration and the deployed configuration.

12. The passenger seat of claim 8, wherein the at least one sliding mechanism is electronically controlled to move the vertically extending panel between the stowed configuration and the deployed configuration.

13. The passenger seat of claim 8, wherein at least a portion of the vertically extending panel is translucent.

14. The passenger seat of claim 8, wherein a lowermost edge of the vertically extending panel is approximately aligned with a seat pan of the passenger seat.

15. The passenger seat of claim 8, further comprising a lock mechanism to secure the vertically extending panel in at least one of the stowed configuration and the deployed configuration.

16. The passenger seat of claim 8, wherein a top end of the vertically extending panel is above a top end of the seatback.

17. The passenger seat of claim 8, wherein the vertically extending panel is automatically moved to the stowed configuration based on a predetermined vehicle condition.

* * * * *